US008725335B2

(12) United States Patent
Tolkacz et al.

(10) Patent No.: US 8,725,335 B2
(45) Date of Patent: May 13, 2014

(54) SYSTEM AND METHODS FOR TORQUE CONTROL IN AN ELECTRONIC ALL WHEEL DRIVE VEHICLE

(75) Inventors: Joseph M. Tolkacz, Novi, MI (US); R Travis Schwenke, Springboro, OH (US); Michael Kochem, Weiterstadt (DE); Edmund F. Gaffney, III, White Lake, MI (US); William R. Cawthorne, Milford, MI (US); Thomas A Klingler, Lake Orion, MI (US); Richard A. Marsh, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/460,184

(22) Filed: Apr. 30, 2012

(65) Prior Publication Data

US 2013/0289811 A1 Oct. 31, 2013

(51) Int. Cl.
*B60L 11/00* (2006.01)
(52) U.S. Cl.
USPC .......................................................... 701/22
(58) Field of Classification Search
USPC .......................................................... 701/22
See application file for complete search history.

(56) References Cited

U.S. PATENT DOCUMENTS

| 5,656,921 | A | 8/1997 | Farrall | |
|---|---|---|---|---|
| 6,725,989 | B1 * | 4/2004 | Krisher et al. | 192/35 |
| 7,739,005 | B1 * | 6/2010 | Tang | 701/22 |
| 2005/0182526 | A1 | 8/2005 | Hubbard et al. | |
| 2005/0252474 | A1 | 11/2005 | Sah et al. | |
| 2005/0255966 | A1 | 11/2005 | Tao et al. | |
| 2005/0256623 | A1 | 11/2005 | Hubbard et al. | |
| 2005/0256629 | A1 | 11/2005 | Tao et al. | |
| 2005/0256631 | A1 | 11/2005 | Cawthrone et al. | |
| 2006/0194670 | A1 | 8/2006 | Heap et al. | |
| 2009/0204280 | A1 | 8/2009 | Simon, Jr. et al. | |
| 2011/0196555 | A1 * | 8/2011 | Hennings et al. | 701/22 |
| 2012/0165148 | A1 * | 6/2012 | Boskovitch et al. | 475/5 |

* cited by examiner

*Primary Examiner* — Mary Cheung
*Assistant Examiner* — Anne Mazzara
(74) *Attorney, Agent, or Firm* — Ingrassia, Fisher & Lorenz, P.C.

(57) ABSTRACT

Methods and apparatus are provided for torque control in an electric all wheel drive (e AWD) vehicle. The apparatus is a system having at least one propulsion system capable of determining a desired torque command and torque capability data for a primary and secondary axle. Also included are one or more active chassis systems capable of providing chassis system data and a processor coupled for processing the desired torque command, the torque capability data and the chassis system data to provide a maximum torque limit and a minimum torque limit for the secondary axle. In this way, at least one propulsion system processes the desired torque signal and the maximum torque limit and the minimum torque limit to provide an electric motor torque command and an engine torque command for the eAWD vehicle. A method for torque control in an eAWD vehicle is also provided.

20 Claims, 3 Drawing Sheets

SYSTEM AND METHODS FOR TORQUE CONTROL IN AN ELECTRONIC ALL WHEEL DRIVE VEHICLE

TECHNICAL FIELD

The technical field generally relates to electronic all wheel drive (eAWD) vehicles, and more particularly relates to systems and method for controlling the application of torque between a primary and secondary axles of an eAWD vehicle.

BACKGROUND

Contemporary vehicles include one or more active chassis systems. For example, anti-lock brakes, electronic stability control and electronic traction control systems improve vehicle dynamics while providing enhanced safety for the vehicle and its occupants. Similarly, propulsion systems typically include active systems to enhance efficiency, promote fuel economy and provide for a pleasurable driving experience for the operator of the vehicle. One example of how chassis and propulsion systems achieve these goals is by employing algorithms for control of torque applied to the vehicle axles. However, under certain driving conditions and depending upon the driving habits of the vehicle operator, the chassis systems and propulsion systems may have potentially competing control algorithms resulting in reduced efficiency and performance of one or both systems.

Accordingly, it is desirable to control vehicle torque without reducing vehicle efficiency or performance. In addition, it is desirable to reduce potential conflict between chassis systems and propulsion systems of vehicles. Furthermore, other desirable features and characteristics of the present disclosure will become apparent from the subsequent detailed description and the appended claims, taken in conjunction with the accompanying drawings and the foregoing technical field and background.

SUMMARY

An apparatus is provided for torque control in an electric all wheel drive (eAWD) vehicle. In one embodiment, the apparatus is a system having at least one propulsion system capable of determining a desired torque command and torque capability data for a primary and secondary axle of the eAWD vehicle. Also included are one or more active chassis systems capable of providing chassis system data and a processor coupled to the at least one propulsion system and the one or more active chassis systems for processing the desired torque command, the torque capability data and the chassis system data to provide a maximum torque limit and a minimum torque limit for the secondary axle. In this way, at least one propulsion system processes the desired torque signal and the maximum torque limit and the minimum torque limit to provide an electric motor torque command and an engine torque command for the eAWD vehicle.

A method is provided for torque control in an electric all wheel drive vehicle. In one embodiment, the method includes determining a desired torque command for the eAWD vehicle and processing the desired torque command in one or more chassis systems of the eAWD vehicle to provide chassis data. The chassis data is processed with torque capability data for a primary and secondary axle of the eAWD vehicle in a processor to provide a maximum torque limit and a minimum torque limit for the secondary axle. The maximum and minimum torque limits for the secondary axle is processed with the desire torque command in a propulsion system of the eAWD vehicle to provide an electric motor torque command and an engine torque command. Finally, the total achieved torque is communicated to the processor together with the torque capability data for a primary and secondary axle.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to vehicle electrical and mechanical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-2 are merely illustrative and may not be drawn to scale.

Figure 1:
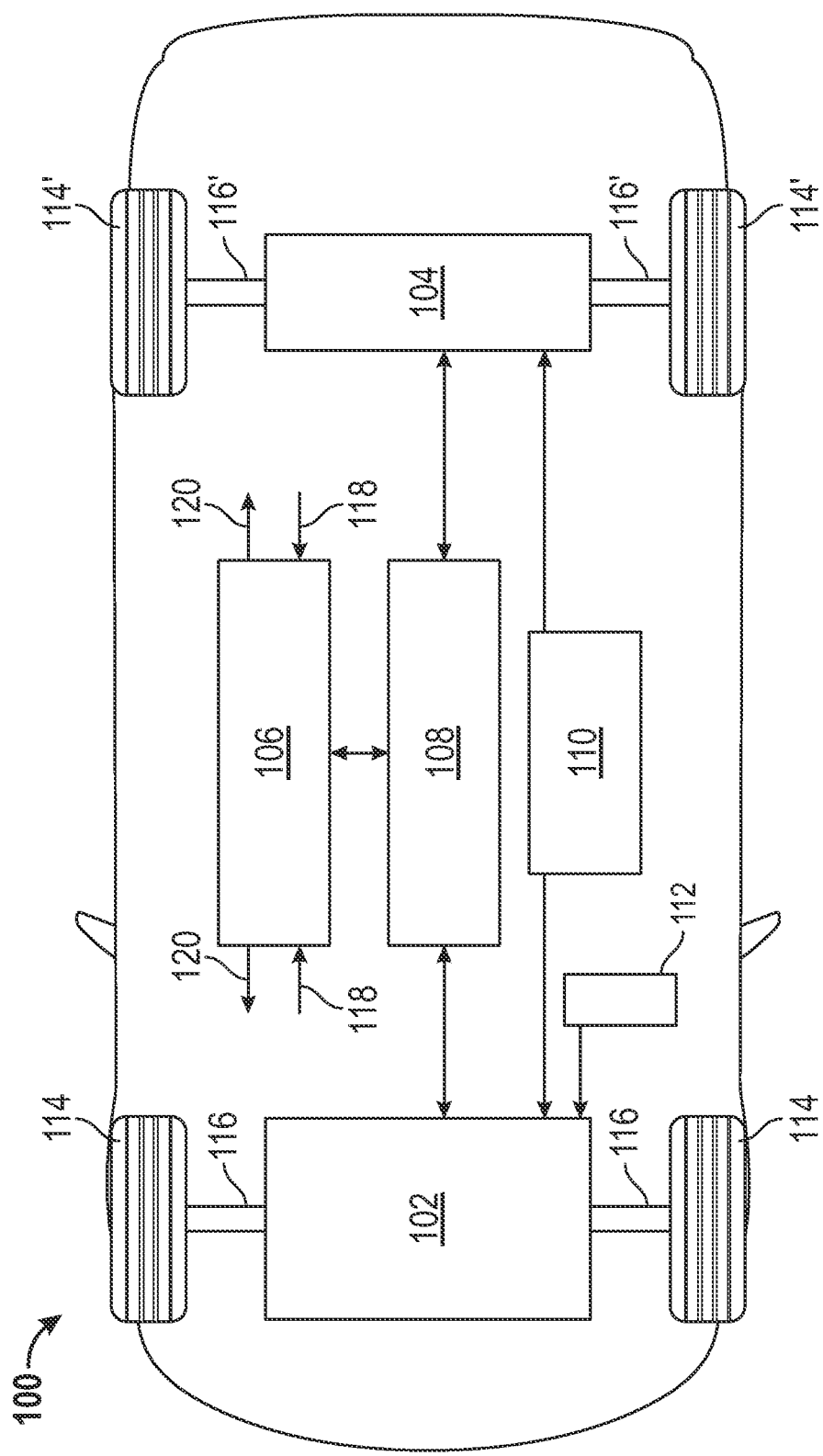
FIG. 1 is functional block diagram of a vehicle in accordance with an embodiment.
Figure 2:
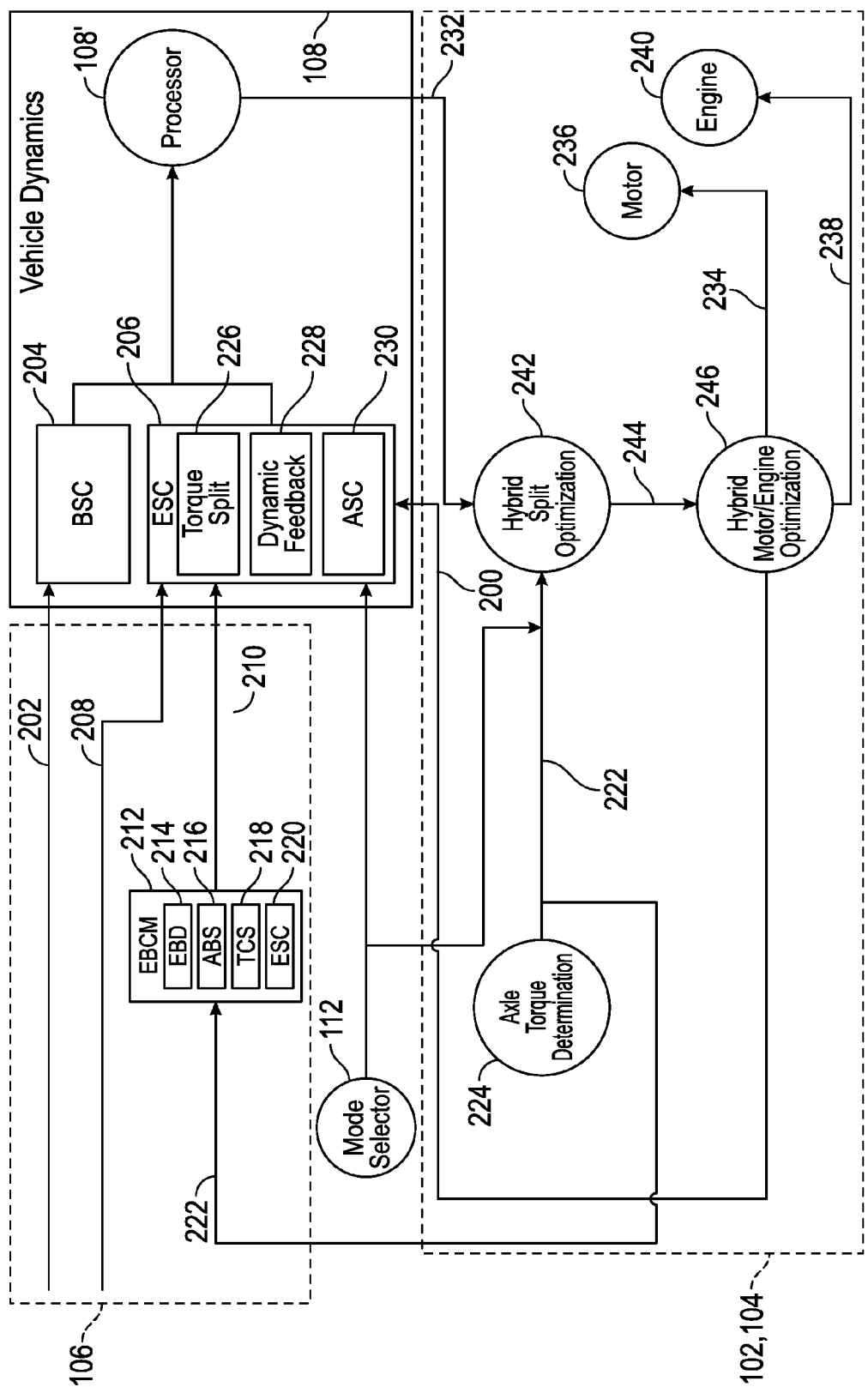
FIG. 2 is a detailed functional block diagram of portions of the vehicle of FIG. 1 in accordance with an embodiment.

Referring to the drawings, wherein like reference numbers refer to like components, FIG. 1 shows a block diagram of a vehicle 100 illustrating the functional operation of embodiments of the present disclosure. The vehicle 100 may be any one of a number of different types of vehicles, such as, for example, a sedan, a wagon, a truck, or a sport utility vehicle (SUV). As illustrated, the vehicle 100 is an electronic all-wheel drive (eAWD) vehicle that includes, without limitation: a front propulsion system 102, a rear propulsion system 104, one or more chassis systems 106 and a vehicle dynamics processor 108 that provides an interface and cooperative functionality between the propulsion systems 102, 104 and the chassis systems 106. A power storage system 110 provides power to various systems, sub-systems and circuits of the vehicle 100, including the front and rear propulsion systems 102, 104. Optionally, a driving mode selector 112 may be provided that permits an operator of the vehicle 100 to select a preferred driving mode selection.

The front propulsion system 102 may include an engine and an electric motor arranged in a hybrid-electric drive configuration for the vehicle 100. The engine may by any one of, or combination of, a number of different types of engines, such as, for example, a gasoline or diesel fueled combustion engine, a flex fuel vehicle (FFV) engine (i.e., using a mixture of gasoline and alcohol) or a gaseous compound (e.g., hydrogen and/or natural gas) fueled engine. The rear propulsion system 104 typically includes an electric motor and a power inverter for providing torque from the rear propulsion system 104 to rear wheels 114' via a secondary drive axle 116'. It will be appreciated that both a front wheel drive based eAWD embodiment and a rear wheel drive based eAWD embodiment are contemplated as within the scope of the present disclosure. Optionally, the propulsion systems 102 and 104 are responsive to a drive mode selection module 112, that may be used by the operator of the vehicle 100 to define a drive mode selection. Typical drive mode selections include, but are not limited to, off-road, mud/snow, sport, comfort or fuel economy.

The chassis systems 106 may include one or more of a variety of active chassis system including, without limitation, electronic break distribution, anti-lock brakes, electronic stability control and traction control. The chassis systems 106 typically operate via receiving information from sensors (via connection 118) and transmitting control signals (via connection 120) to various actuators, valves, solenoids and the like positioned throughout the vehicle 100 to enhance vehicle dynamics and promote safe operation of the vehicle and safety for the vehicle occupants.

The power storage system 110 preferably comprises a rechargeable battery having a pack of battery cells. In one embodiment, the power storage system 110 comprises a lithium iron phosphate battery, such as a nanophosphate lithium ion battery, although other battery chemistries or fuel cells may be employed in any particular implementation.

The vehicle dynamics processor 108 provides an interface and cooperative functionality between the propulsion systems 102, 104 and the chassis systems 106. As described in more detail below, the vehicle dynamics processor resolves potentially conflicting torque control commands or functionality that might be generated between independently functioning propulsion systems and chassis systems as in conventional vehicles. In some circumstances, the propulsion systems 102, 104 will have priority control over what torque is applied to the primary axle 116 and the secondary axle 116'. In other circumstances, the chassis system 106 will have priority torque control. In still other circumstances, a shared control of torque will be achieved via the cooperative torque control functionality provided by the vehicle dynamics processor 108.

Referring to FIG. 2, wherein like reference numbers refer to like components, a more detailed block diagram of certain components of the vehicle 100 of FIG. 1 are illustrated to facilitate understanding of the functional operation of embodiments of the present disclosure. According to exemplary embodiments, the vehicle dynamics processor 108 communicates with both the propulsion systems 102, 104 and the chassis systems 106 to provide an interface between those systems. Communication may be achieved via a conventional vehicular communications bus or other wired or wireless communication system as may be employed in any particular embodiment. The cooperative functionality provided by the vehicle dynamics processor 108 may be realized by any type of processing element 108' such as, without limitation, general or special purpose microprocessors, microcontrollers, reduced instruction set controllers (RISC), application specific integrated circuits (ASIC) or programmable gate arrays (PGA), which may be equipped with nonvolatile memory, random access memory (RAM), discrete and analog input/output (I/O), and/or communications interfaces for networking within a vehicular communications network. As such, it will be appreciated that the physical location of the vehicle dynamics processor 108 with the vehicle (100 of FIG. 1) is not critical and may be realized in some embodiments as residing within one of the propulsion system controllers or one of the chassis system controllers. In other embodiments, the vehicle dynamics processor may be realized as a standalone module or as integrated into a vehicle processor (not shown) supervising the overall operation of the vehicle.

From the propulsion systems 102 and 104, the vehicle dynamics processor 108 receives signals (via connection 200) indicating the current torque capability for the primary and secondary axles (116 and 116' in FIG. 1). From the chassis systems, the vehicle dynamics processor receives control signals 202 for a base slip controller 204. The control signals 202 may be provided in some embodiments from on-board diagnostic (OBD) monitors or sensors to indicate the speed of the wheels (114 and 114' of FIG. 1) so that the base slip controller 204 may transfer torque from the primary axle 116 to the secondary axle 116' upon detecting that the front wheels 114 are slipping. This base slip control function is commonly known as "on-demand all wheel drive", and while useful, takes action after a slippage event has occurred, which may be at odds in some embodiments with more preemptive slip controls function provided by the enhanced slip controller 206.

The enhanced slip controller 206 also receives signals from the chassis systems 106. A first signal 208 provides supplemental vehicle information, such as, for example, steering wheel angle and lateral and longitudinal acceleration of the vehicle (100 in FIG. 1). A second signal 210 is provided by the electronic brake control module 212 (EBCM), which processes signals provided by one or more chassis systems, such as, without limitation, electronic brake distribution 214 (EBD), anti-lock breaking system 216 (ABS), traction control system 218 (TCS) and electronic stability control 220 (ESC). Collectively, the chassis system within the EBCM 212 receive a desired torque command 222 provided from the propulsion system 102, 104. Typically, the desired torque command 222 is generated following input from the vehicle operator in an axle torque determination module 224 (which may include some filtering or signal processing of the operator input). Each chassis system within the EBCM 212 processes the desired torque command 222 and the EBCM 212 provides the second signal 210, which with the first signal 208 and the control signals 202 comprise chassis data that is useful for determining whether torque to the secondary axle (116' in FIG. 1) should be limited in furtherance of vehicle safety.

In some embodiments, a driving mode selector 112 is coupled to vehicle dynamics processor to provide a selected drive mode to the enhanced slip controller 206. Using these signals, the enhanced slip controller 206 provides several functionalities within the vehicle dynamics processor 108. First, a pre-emptive torque split function 226 determines when to split torque between the primary axle 116 and secondary axle 116'. Also, vehicle dynamic feedback 228 is provided to evaluate whether the desire torque (represented by the desired torque command 222) was achieved, and if not, what the torque capabilities of the primary and secondary axle have to accept applied torque. Finally, torque requirements directed by the driver mode selection is evaluated (230) with the other functions of the enhanced slip controller 206 and combined with the functionality of the base slip controller 204 in the processing element 108' of the vehicle dynamics processor 108.

The output 232 of the vehicle dynamics processor 108 is a signal that includes a maximum torque limit for the secondary axle and a minimum torque limit for the secondary axle. Using these limits, which may represent a permissible torque range, the propulsion system 102, 104 cooperates with the chassis systems 106 through the interface provided by the vehicle dynamics processor 108. In some circumstances, the permissible torque range represented by the output signal 232 will exceed the current torque capabilities of the secondary axle. Since the permissible range exceeds the capable range, the propulsion systems 102, 104 have torque priority since they may apply any torque that can be accepted by the secondary axle. In other circumstances, the permissible torque range represented by the output signal 232 will be less than the current torque capabilities of the secondary axle. In such situations, torque priority is shared between the chassis systems 106 and the propulsion systems 102, 104 since the propulsion systems may apply any torque within the specified range to the secondary axle. In still other circumstances, the output signal 232 will provide the same value for the maximum and minimum torque limits for the secondary axle indicating that the chassis system has priority over the torque that may be applied to the secondary axle. Typically, this is done for potential safety issues, performance or customer satisfaction.

The propulsion systems 102, 104 receive and process the output signal 232 of the vehicle dynamics processor 108 to provide motor commands 234 to the electric motors 236 of the rear propulsion system 104 (and optionally, the electric motors of the front propulsion system 102) and engine commands 238 to the engine 240 of the front propulsion system 102. In some embodiments, this is implemented through hybrid optimization modules including a hybrid split optimization module 242 and a hybrid motor/engine optimization module 246. The hybrid split optimization module 242 processes the output signal 232, the desired torque command 222 (and optionally the driver mode selection (provided by the ECM 224)) and provides primary and secondary axle torque commands 244, which specify how torque is to be split between the primary and secondary axles (116 and 116' in FIG. 1). These commands are further processed by the hybrid motor/engine optimization module 246 to provide the motor commands 234 and the engine commands 238 to the electric motor(s) 236 and engine 240, respectively. The hybrid motor/engine optimization module 246 also is capable of determining the torque achieved by the primary and secondary axle, which information is provided as feedback (via connection 200) to the vehicle dynamics processor 108 together with the then current primary and secondary axle torque capability.

As one operative example, consider that a vehicle operator calls for a high level of torque to be delivered. The desired torque command 222 representing the operators designed torque is processed by the chassis systems 106 which provide the chassis data (202, 208 and 210) to the vehicle dynamics processor 108. The vehicle dynamics processor 108 also receives (via connection 200) the current primary and secondary axle torque capability information from the propulsion systems 102, 104. The output 232 of the vehicle dynamics processor 108 includes a maximum torque limit and a minimum torque limit for the secondary axle, which in this example, are each assumed to be less than the torque that the primary and secondary axles can accept (that is, a shared torque control situation). The propulsion systems 102, 104 provide the motor commands 234 and the engine commands 238 to the electric motor(s) 236 and engine 240, respectively, and determine the achieved torque of the primary and secondary axles. Since the operator's desired torque was at a high level and the maximum and minimum torque limits for the secondary axle were both less than the torque the primary and secondary axles could accept, assume that it is reported (via the connection 200) by the propulsion systems 102, 104 that the operator's desired torque was not achieved. However, should the current driving situation change or the desired torque command change, the chassis systems 106 could change the chassis data provided to the vehicle dynamics processor 108, which in turn will provide a broader torque range by increasing the difference between the maximum and minimum torque limit for the secondary axle. This cooperative feedback between the propulsion systems 102, 104 and the chassis systems 106 will continue until the desired torque command is achieved in the primary and secondary axles.

Figure 3:
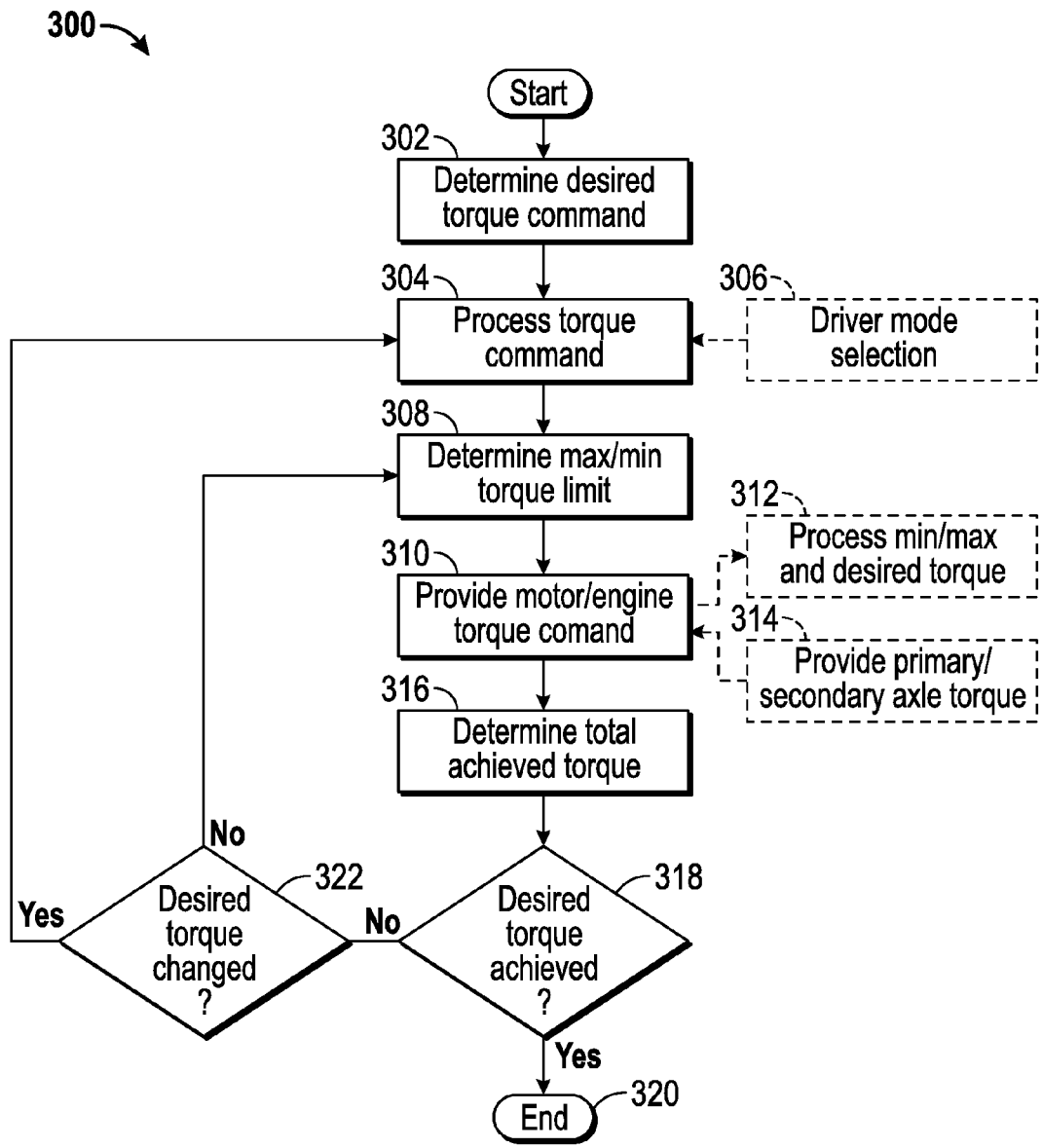
FIG. 3 is a flow diagram of a method in accordance with an embodiment.

Referring now to FIG. 3, a flow diagram is provided to facilitate understanding the cooperative torque control between the propulsion systems (102 and 104 of FIG. 1) and the chassis systems (106 of FIG. 1). The various tasks performed in connection with the method 300 of FIG. 3 may be performed by software, hardware, firmware, or any combination thereof. For illustrative purposes, the following description of the method of FIG. 3 may refer to elements mentioned above in connection with FIGS. 1-2. In practice, portions of the method of FIG. 3 may be performed by different elements of the described system. It should also be appreciated that the method of FIG. 3 may include any number of additional or alternative tasks and that the method of FIG. 3 may be incorporated into a more comprehensive procedure or process having additional functionality not described in detail herein. Moreover, one or more of the tasks shown in FIG. 3 could be omitted from an embodiment of the method of FIG. 3 as long as the intended overall functionality remains intact.

The routine begins in step 302, where a desired torque command (222 in FIG. 2) is determined for the vehicle (100 in FIG. 1). In some embodiments, this is determined in a torque determination module (224 in FIG. 2) of the propulsion systems (102 and 104 in FIG. 2). Next, step 304 processes the desired torque command in one or more chassis systems (106 in FIG. 2) of the vehicle to provide chassis data (collectively 202, 208 and 210 in FIG. 2). Optionally, step 306 provides a drive mode selection made by the operator of the vehicle to step 304. The vehicle dynamics processor (108 in FIG. 2) then determines (step 308) a maximum torque limit and a minimum torque limit for the secondary axle by processing the chassis data (and optionally the drive mode selection) and torque capability data for a primary and secondary axle of the vehicle. The vehicle dynamics processor passes the maximum and minimum torque limits for the secondary axle to the propulsion systems (102 and 104 in FIG. 2), which is processed with the desired torque command (and optionally the drive mode selection) to provide an electric motor torque command and an engine torque command (step 310).

In one embodiment, this is accomplished by first processing (in step 312) the maximum and minimum torque limits (and optionally the drive mode selection) and the desired torque command to provide a primary axle torque command and a secondary axle torque command (244 in FIG. 2). These signal are then further processed (in step 314) to provide the electric motor torque command (234 in FIG. 2) and the engine torque command (238 in FIG. 2). The electric motor torque command and the engine torque command are provided to electric motor(s) (236 in FIG. 2) and the engine (240 in FIG. 2) and a determination is made of the total achieved torque in the primary and secondary axles, which is communicated to the vehicle dynamics processor (108 in FIG. 2) along with the torque capability data for a primary and secondary axle (step 316). Decision 318 then determines whether the desired torque command was in fact achieved. If so, the routine ends (step 320), however, a negative determination of decision 318 branches the routine to decision 322, which determines whether the desired torque command (222 in FIG. 2) has changed. If so, the routine loops back to step 304 where the chassis systems (106 in FIG. 2) recompute the chassis data for the vehicle processor. If the desired torque command is the same (and unachieved in this branch of the routine), control is looped back to step 308 where the vehicle dynamics processor (108 in FIG. 2) again determines the maximum minimum torque limit for the secondary axle, which may be the same or different than the last determination depending upon the current torque capability information for the primary and secondary axles provided by the propulsion systems (102 and 104 in FIG. 2).

Accordingly, vehicle torque control is provided for an eAWD vehicle without reducing the efficiency or performance of the propulsion systems or the chassis systems. Additionally, any potential conflict between chassis systems and propulsion systems is reduced or eliminated by the cooperative functionality provided by interfacing these system through the vehicle dynamics processor, the physical location of which is not critical and may be realized as residing within one of the propulsion system controllers, one of the chassis system controllers or as a standalone module.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling torque in an electronic all wheel drive (eAWD) vehicle, comprising:
   determining a desired torque command for the eAWD vehicle;
   processing the desired torque command in one or more chassis systems of the eAWD vehicle to provide chassis data;
   processing the chassis data and torque capability data for a primary and secondary axle of the eAWD vehicle in a processor to provide a maximum torque limit and a minimum torque limit for the secondary axle;
   comparing the torque capability data for the secondary axle to the maximum torque limit and the minimum torque limit for the secondary axle to determine whether the propulsion system, the chassis systems or both the propulsion system and the chassis systems have torque priority for the secondary axle;
   providing, by the propulsion system, an electric motor torque command and an engine torque command when the propulsion system has torque priority for the secondary axle;
   providing, by the chassis systems, the electric motor torque command and the engine torque command when the chassis systems has torque priority for the secondary axle;
   processing, when both the propulsion system and the chassis systems have torque priority for the secondary axle, the desired torque command and the maximum and minimum torque limits for the secondary axle in a propulsion system of the eAWD vehicle to provide an electric motor torque command and an engine torque command; and
   determining total achieved torque and communicating the total achieved torque and the torque capability data for a primary and secondary axle to the processor.

2. The method for controlling torque in the eAWD vehicle of claim 1, further comprising:
   receiving a drive mode selection; and
   processing the drive mode selection with the chassis data and the torque capability data to provide the maximum torque limit and the minimum torque limit for the secondary axle.

3. The method for controlling torque in the eAWD vehicle of claim 2, further comprising processing the drive mode selection with the desired torque command and the maximum and minimum torque limits to provide the electric motor torque command and the engine torque command.

4. The method for controlling torque in the eAWD vehicle of claim 1, wherein processing the desired torque command and the maximum and minimum torque limits for the secondary axle further comprises:
   processing the desired torque command and the maximum and minimum torque limits to provide a primary axle torque command and a secondary axle torque command; and
   further processing the primary and secondary axle torque command to provide the electric motor torque command and the engine torque command.

5. The method for controlling torque in the eAWD vehicle of claim 4, further comprising:
   receiving a drive mode selection; and
   processing the drive mode selection with the chassis data and the torque capability data to provide the maximum torque limit and the minimum torque limit to provide the primary axle torque command and the secondary axle torque command.

6. The method for controlling torque in the eAWD vehicle of claim 1, wherein processing the chassis data and torque capability data in the processor provides a torque range for the maximum torque limit and the minimum torque limit for the secondary axle equal to or greater than the torque capability data when the propulsion system has priority over applied torque.

7. The method for controlling torque in the eAWD vehicle of claim 1, wherein processing the chassis data and torque capability data in the processor provides a torque range for the maximum torque limit and the minimum torque limit for the secondary axle less than the torque capability data when the chassis systems and the propulsion system share priority over applied torque.

8. The method for controlling torque in the eAWD vehicle of claim 1, wherein processing the chassis data and torque capability data in the processor provides a common value for the maximum torque limit and the minimum torque limit for the secondary axle when the chassis systems has priority over applied torque.

9. An electronic all wheel drive (eAWD) torque control system, comprising:
 at least one propulsion system capable of determining a desired torque command and torque capability data for a primary and secondary axle;
 one or more active chassis systems capable of providing chassis system data; and
 a processor coupled to the at least one propulsion system and the one or more active chassis systems for processing the desired torque command, the torque capability data and the chassis system data to provide a maximum torque limit and a minimum torque limit for the secondary axle, the processor configured to compare the torque capability data to the maximum torque limit and the minimum torque limit to determine whether the propulsion system, the chassis systems or both the propulsion system and the chassis systems have torque priority for the secondary axle;
 wherein, the propulsion system provides an electric motor torque command and an engine torque command when the propulsion system has torque priority for the secondary axle;
 wherein, the chassis systems provides the electric motor torque command and the engine torque command when the chassis systems has torque priority for the secondary axle; and
 wherein, both the propulsion system and the chassis systems contribute to provide the electric motor torque command and the engine torque command when both the propulsion system and the chassis systems have torque priority for the secondary axle.

10. The eAWD torque control system of claim 9, further comprising a drive mode selection module for providing a drive mode selection from a user.

11. The eAWD torque control system of claim 10, wherein the drive mode selection provided by the user comprises one of the following group of drive modes: off-road, mud/snow, sport, comfort or fuel economy.

12. The eAWD torque control system of claim 9, wherein the at least one propulsion system includes a hybrid split optimization module for processing the desired torque signal and the maximum torque limit and the minimum torque limit to provide a primary axle torque command and a secondary axle torque command.

13. The eAWD torque control system of claim 12, which includes a drive mode selection module for providing a drive mode selection; and
 wherein the hybrid split optimization module processes the drive mode selection with the desired torque signal, the maximum torque limit and the minimum torque limit to provide the primary axle torque command and the secondary axle torque command.

14. The eAWD torque control system of claim 12, wherein the at least one propulsion system includes a hybrid motor/engine optimization module for processing the primary axle torque command and the secondary axle torque command to provide the electric motor torque command and the engine torque command.

15. The eAWD torque control system of claim 9, wherein the one or more active chassis systems include one or more of the following group of active chassis systems: electronic break distribution, anti-lock brakes, electronic stability control and traction control.

16. An electronic all wheel drive (eAWD) vehicle, comprising:
 an engine configured to drive a primary axle;
 an electric motor configured to drive a secondary axle;
 at least one propulsion system capable of determining a desired torque command and torque capability data for the primary and the secondary axle;
 one or more active chassis systems capable of providing chassis system data; and
 a processor coupled to the at least one propulsion system and the one or more active chassis systems for processing the desired torque command, the torque capability data and the chassis system data to provide a maximum torque limit and a minimum torque limit for the secondary axle, the processor configured to compare the torque capability data to the maximum torque limit and the minimum torque limit to determine whether the propulsion system, the chassis systems or both the propulsion system and the chassis systems have torque priority for the secondary axle;
 wherein, the propulsion system provides an electric motor torque command and an engine torque command when the propulsion system has torque priority for the secondary axle;
 wherein, the chassis systems provides the electric motor torque command and the engine torque command when the chassis systems has torque priority for the secondary axle; and
 wherein, both the propulsion system and the chassis systems contribute to provide the electric motor torque command and the engine torque command when both the propulsion system and the chassis systems have torque priority for the secondary axle to the engine.

17. The eAWD vehicle of claim 16, wherein the at least one propulsion system includes a hybrid split optimization module for processing the desired torque signal and the maximum torque limit and the minimum torque limit to provide a primary axle torque command and a secondary axle torque command.

18. The eAWD vehicle of claim 17, which includes a drive mode selection module for providing a drive mode selection; and
 wherein the hybrid split optimization module processes the drive mode selection with the desired torque signal, the maximum torque limit and the minimum torque limit to provide the primary axle torque command and the secondary axle torque command.

19. The eAWD vehicle of claim 17, wherein the at least one propulsion system includes a hybrid motor/engine optimization module for processing the primary axle torque command and the secondary axle torque command to provide the electric motor torque command and the engine torque command.

20. The eAWD vehicle of claim 16, wherein the one or more active chassis systems include one or more of the following group of active chassis systems: electronic break distribution, anti-lock brakes, electronic stability control and traction control.

* * * * *